Feb. 11, 1930. J. W. BETTENDORF 1,746,301
PERMANENT MOLD
Original Filed May 12, 1926 5 Sheets-Sheet 1
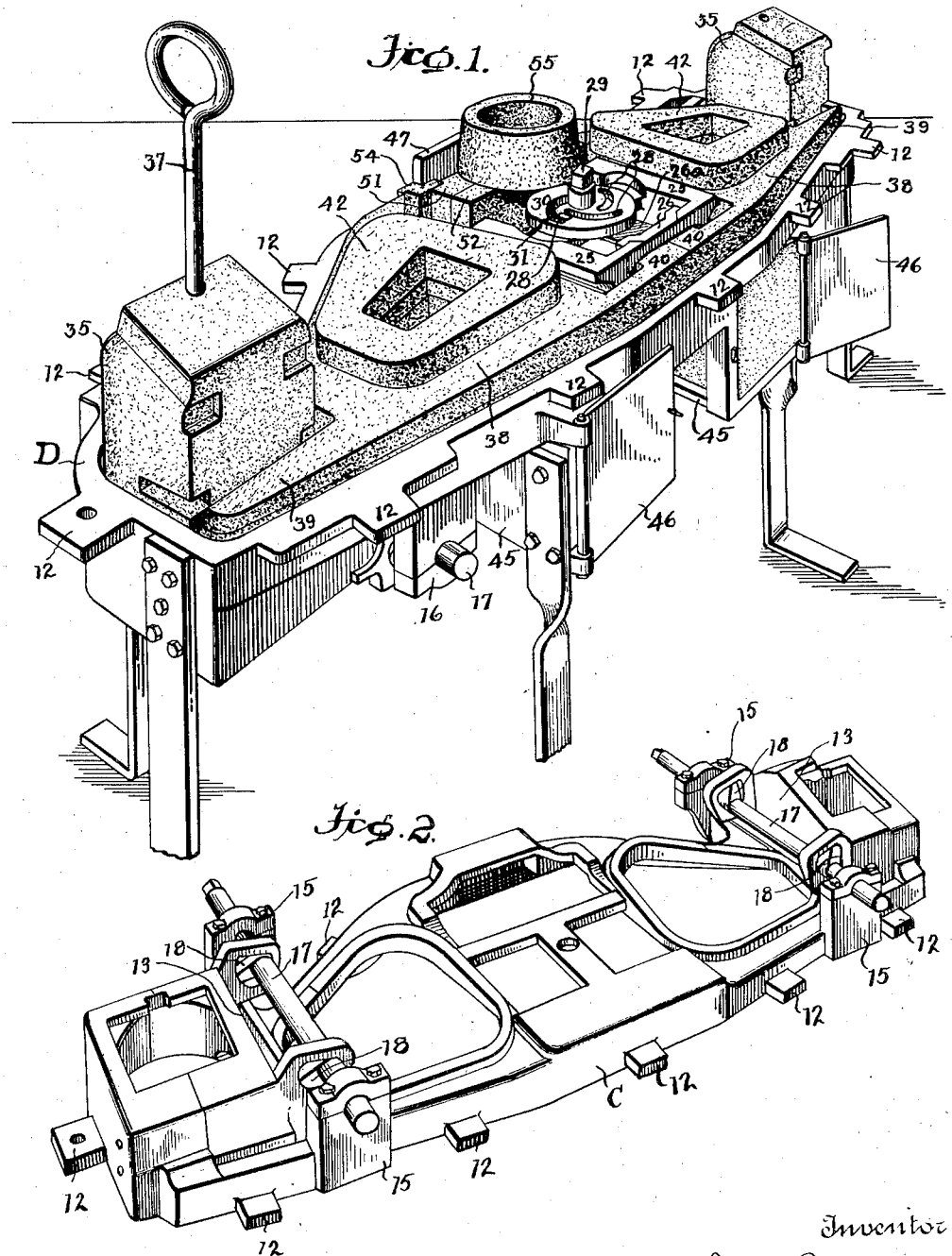

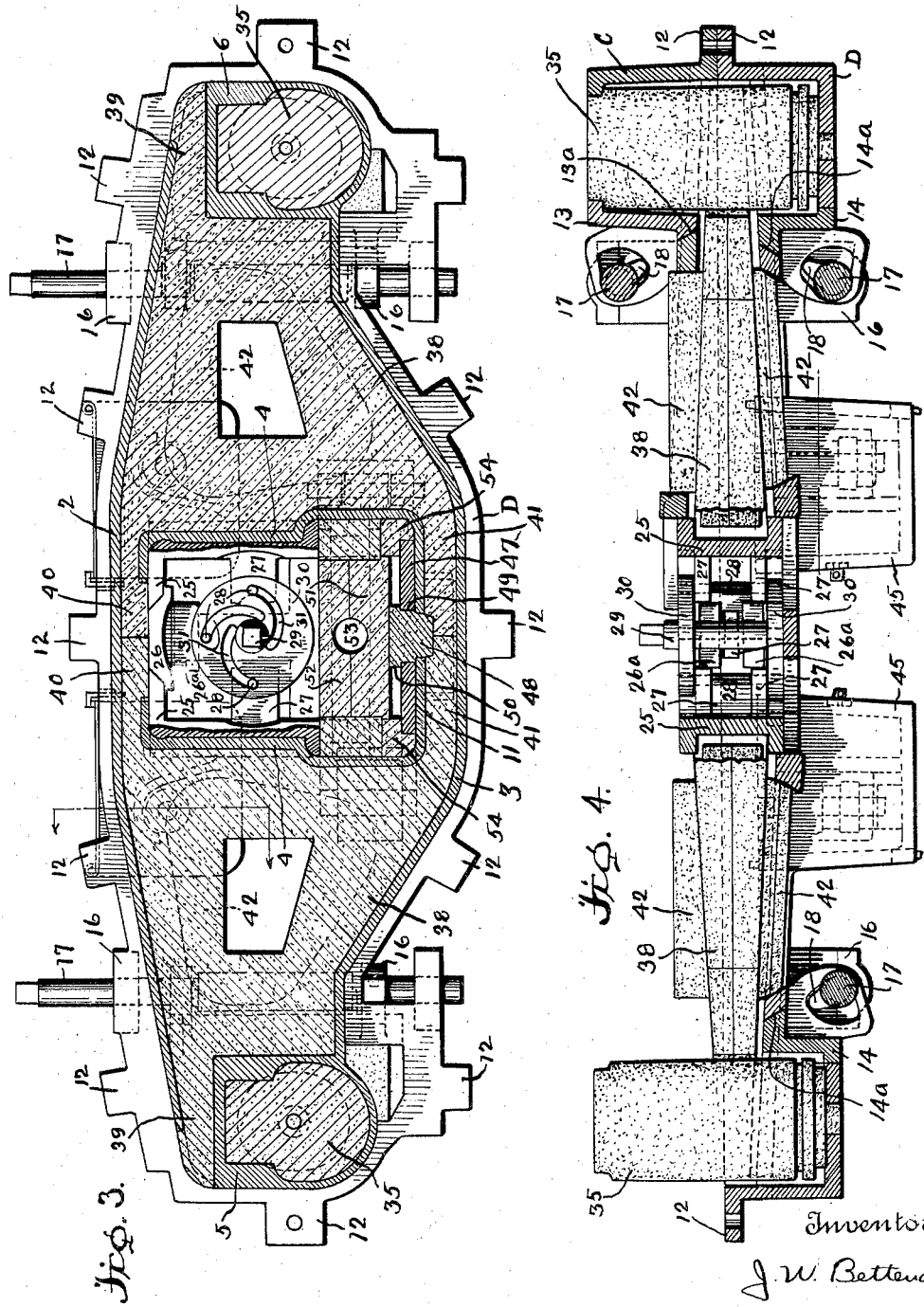

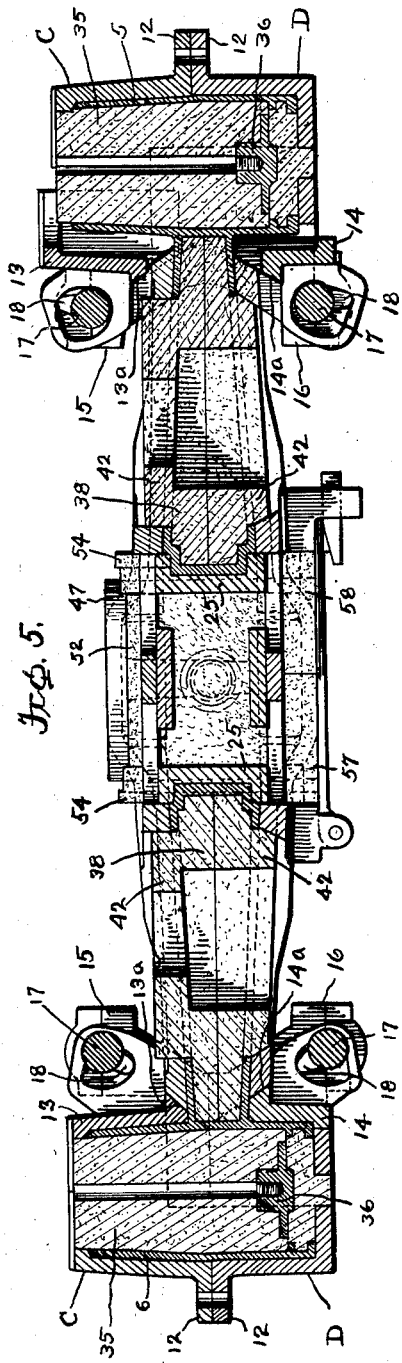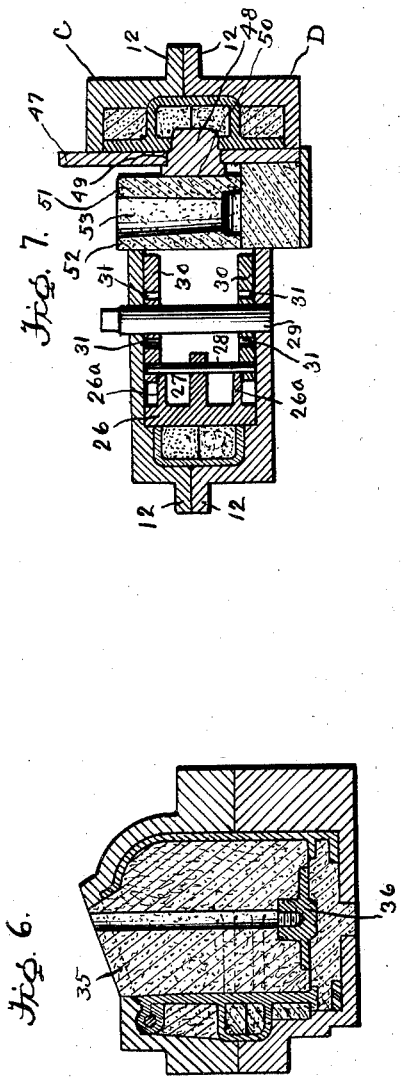

Feb. 11, 1930.  J. W. BETTENDORF  1,746,301
PERMANENT MOLD
Original Filed May 12, 1926   5 Sheets-Sheet 4
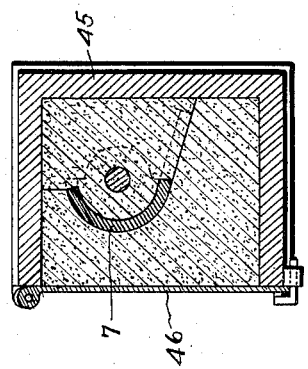
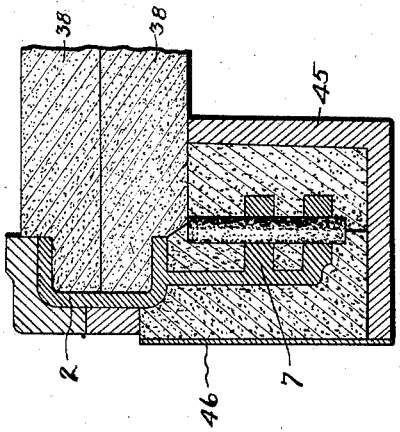
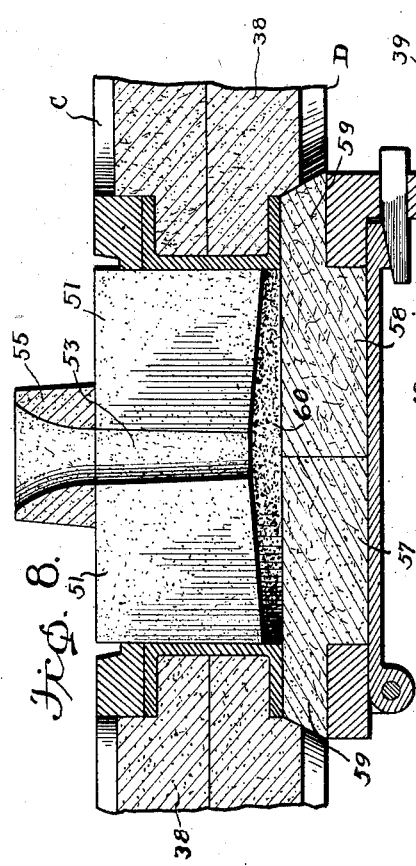
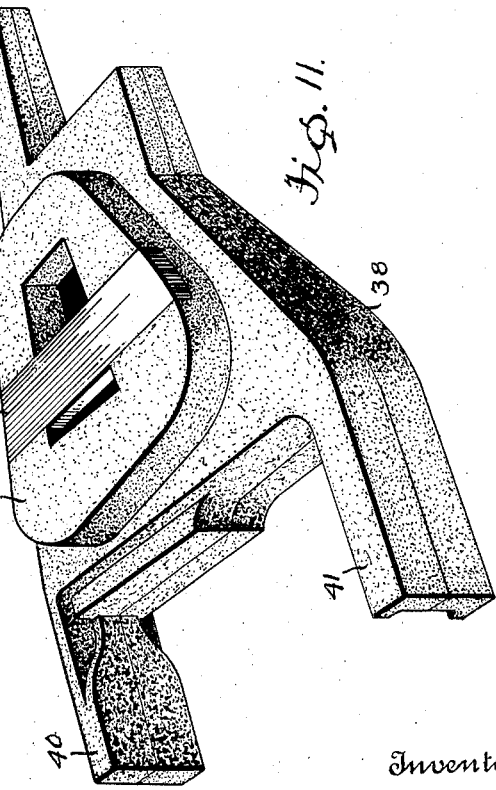
Inventor
J. W. Bettendorf
Evans & McCoy
Attorney Feb. 11, 1930.  J. W. BETTENDORF  1,746,301
PERMANENT MOLD
Original Filed May 12, 1926   5 Sheets-Sheet 5
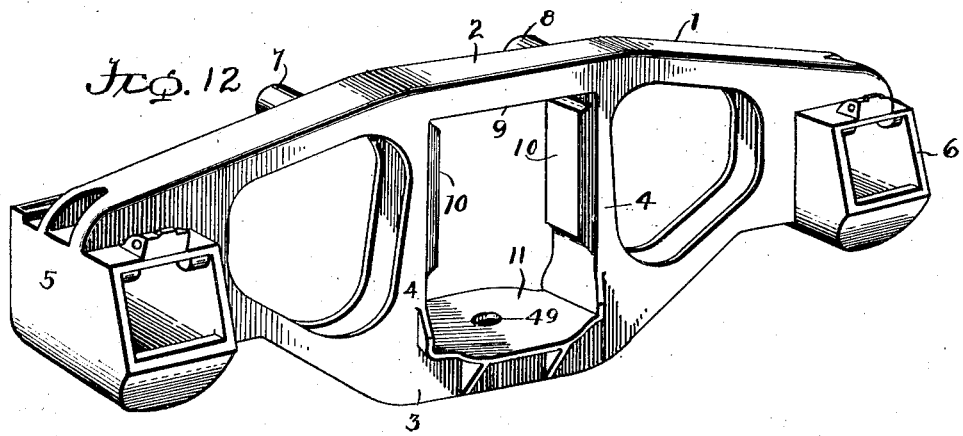
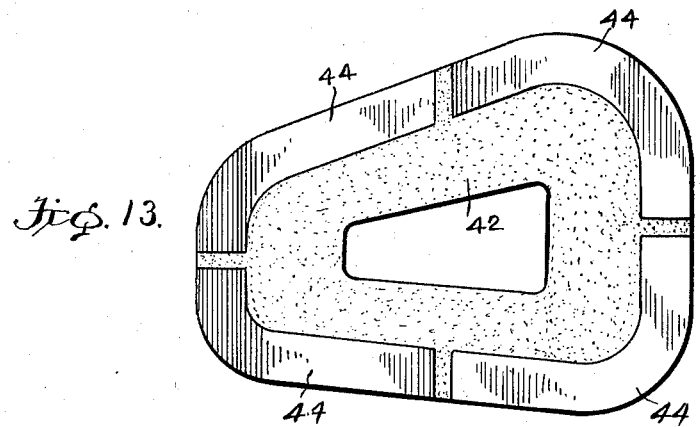
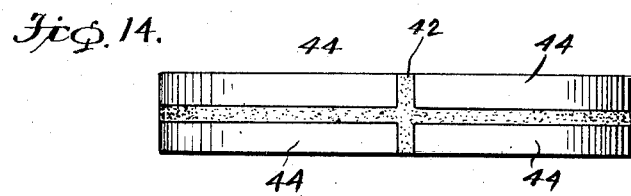

Patented Feb. 11, 1930

1,746,301

UNITED STATES PATENT OFFICE

JOSEPH W. BETTENDORF, OF BETTENDORF, IOWA

PERMANENT MOLD

Original application filed May 12, 1926, Serial No. 108,559. Divided and this application filed October 8, 1926. Serial No. 140,372.

This invention relates to the manufacture of relatively large steel castings, such as railroad car side frames, and more particularly to the mold for making such castings.

This application is a division of my application, Serial No. 108,559, filed May 12, 1926, for the method of making such large steel castings.

Heretofore railroad car truck side frames had been cast in sand molds having baked and green sand cores. The surface of the resulting castings has ordinarily been quite rough and has been impregnated with particles of burnt sand. Fins and other surface irregularities have also occurred as a result of the use of sand molds. To prepare such castings for use in railroad cars it has been found necessary to sand blast the surface generally, and to chip off the surface irregularities, fins, etc. Furthermore, it has been necessary to chip those portions of the casting which must be of relatively accurate dimensions, such as, for example, the seats for springs, bolsters and bearings. It may be noted that such surface finishing has been relatively expensive and has necessarily decreased the rate of production of the castings.

It is an object of my invention to cast side frames and other intricate large steel castings in a metal mold of such construction that the metal of the mold will contact with the exterior of the casting to form smooth external surfaces and yet permit the necessary shrinkage of all parts of the castings to prevent cracking or injuring the metal thereof.

It is also an object of my invention to provide mold members against which may be cast those portions of the inner surfaces of a side frame casting which need to be of accurate dimension to form seats for parts of the railroad car springs and bolsters.

A further object of my invention is to produce a metal mold for casting side frames or the like in which the cope and drag members are easily assembled and clamped together, and in which the metal members which form the inner surfaces of the casting are readily withdrawable inwardly to permit the contraction of the casting upon cooling.

These and other objects will be apparent from the following description and annexed drawings, in which Figure 1 is a perspective view of the mold drag with the sand and metal cores in position.

Fig. 2 is a perspective view of the cope, ready to be set upon the drag.

Fig. 3 is a plan view of the drag with the sand cores and casting metal in horizontal section.

Fig. 4 is a vertical longitudinal section through the mold with the sand cores in position, the left half of the cope being omitted.

Fig. 5 is a view similar to Fig. 4, with the cope in place and the casting also shown in section.

Fig. 6 is a longitudinal section through a journal box.

Fig. 7 is a transverse view through the gate and central core member.

Fig. 8 is a fragmentary longitudinal section through the gate.

Fig. 9 is a transverse section through the portion of the mold in which a brake hanger is cast.

Fig. 10 is a longitudinal section through the portion of the mold in which a brake hanger is cast.

Fig. 11 is a perspective view of the sand cores assembled for one-half of the main body of the casting.

Fig. 12 is a perspective view of a casting formed in the mold.

Fig. 13 is a plan of a modified form of core for forming the window or large opening in the casting.

Fig. 14 is an elevation of the core structure shown in Fig. 13.

A form of mold contemplated by my invention is shown generally in the drawings. The mold as shown is particularly adapted for the casting of a railroad truck side frame 1 which is substantially similar to that shown in Patent 1,351,326, of C. J. W. Clasen, granted August 31, 1920. The casting 1 comprises top and bottom members 2 and 3 and column members 4 extending between the members 2 and 3. At each end of the casting are integral journal boxes 5 and 6 and on one side of the casting are provided brake hanger brackets 7 and 8. The members 2, 3 and 4 define a bolster opening having a top 9, side members 10 and a bottom portion 11 forming a spring seat. The said bolster opening is adapted to receive the bolster and the springs on which the bolster is mounted, as is well known in railroad construction.

The mold comprises a cope member C and a drag member D, which members may be parted in a median plane of the casting as shown in the drawings, or near one edge of the casting 1. After assembly, the mold members may be maintained in assembled relation by clamping means (not shown) cooperatively associated with the lugs 12 on the mold members C and D. The exterior surfaces of the casting members 2 and 3 are formed directly adjacent the inner walls of the cope C and drag D. That portion of the mold which forms the exterior surfaces of the journal boxes remote from the center of the casting is stationary. The portions 13 of the cope and 14 of the drag, however, which form the inwardly facing portions of the exterior of the journal box, must be mounted to move inwardly so that they will permit shrinkage of the journal box portions of the casting toward the center thereof. Thus the said portions 13 and 14 may be moved toward the center of the mold after the solidification of said casting and before the complete shrinkage thereof, as particularly indicated in Figs. 4 and 5, to permit further shrinkage of the casting upon cooling, and consequent moving of the journal boxes toward the center of the casting. The members 13 and 14 are shown as individually moved by similar cam mechanisms. The cope and drag each carry pairs of fixed supports, 15 and 16 respectively, and each pair of supports carries a cam shaft 17 provided with cam fingers 18. The movable portions 13 and 14 of the cope and drag carry projections having cam apertures in which the cam fingers may rotate. The ends of the cam shaft are preferably made square so that they may receive means such as a crank to rotate the shafts, and these shafts may be rotated either manually or mechanically. The portions 13 and 14 of the mold members C and D are provided with cooperative inclined surfaces 13ª and 14ª so that the said portions 13 and 14 are moved upwardly and downwardly respectively and at an angle, and thus the casting is free to shrink toward the center. In Fig. 5 the members 13 and 14 at the left side of the figure are shown in molding position while at the right side of the figure they are shown moved away to permit shrinkage of the casting.

In order to accurately form portions of the inner faces 10 of the column members 4, which define the sides of the bolster opening and to form the inner face 9 of the top member 2 so that they will be smooth and accurate in size, I have provided a plurality of collapsible metal core portions which are readily movable inwardly to permit shrinkage of the casting upon solidification and cooling. A preferred form of mounting this core, so that the portions may be easily and quickly moved inwardly after the casting has been poured, is to have them so connected as to be movable by any suitable common operating mechanism.

The collapsible metal core to form the inner faces of the column members may obviously be of various designs and still be operable by a common operating mechanism. I have shown, however, in the drawing a preferred form of collapsible core, which not only forms the inner faces of the column members but a portion of the inner face of the top member, so that it will also have smooth, accurately sized surfaces.

One form of such mechanism is illustrated herein and comprises the side metal core members 25 adjacent which are formed the inner faces 10 of the column members 4 and also adjacent portions of the inner face 9 of the top member 2. The metal core 26 forms the central portion of the inner face 9 of the top member and overlies the end portions of the core members 25. The core members 25 and 26 are provided with inwardly extending lugs 27 having pins 28 transversely mounted therein. Mounted in the cope and drag is a rotatable shaft 29 having a pair of disc members 30 carried thereby for rotation with the shaft. The disc members 30 are provided with cam slots 31 in which the ends of the pins 28 are carried. Upon rotation of the shaft 29 the metal cores are moved inwardly by the engagement of the ends of the pins 28 in the cam slots 31. The cam slots are preferably so designed that the core member 26 will initially move inwardly at a greater speed than the core members 25, so that there will be no interference between the core members. Preferably the core member 26 is provided with guides 26ª to engage the discs 30 so that said member 26 will move inwardly uniformly and without binding. It will be thus seen that the said core member 26 is movable inwardly simultaneously by common operating means to permit shrinkage of the casting. Preferably the core members 25 not only form the inner faces 10 and 9, respectively, but are channel-shaped in cross section so that they extend over and form part of the outer faces of the column members 4.

The journal box cores 35 are preferably multi-part sand cores, comprising bottom members and top members. Metal inserts 36 may be disposed between said bottom and top members to receive threaded ends of handles 37, said handles being advantageous in positioning said top members within the mold. The bottom members may cooperate with apertures in the adjacent drag member to properly position said bottom members and likewise said metal inserts may be provided with projections coöperating with depressions in said bottom and top members, whereby said inserts and top members may be properly positioned within the mold.

In order to form the substantially triangularly-shaped openings in the side frame and also the inner portions of the top and bottom members which are channel-shaped in cross section, suitable sand cores 38 such as indicated in Figs. 3 and 11 may be employed. Each of the cores 38 is provided with outer extensions 39 to overlie the journal boxes 5, 6. The extensions 40, 41 together with the complementary extensions from the opposed cores 38 form the opposed portions of the top and bottom members 2 and 3. Upon both faces of the cores 38 are the core members 42 which form the triangularly shaped openings in the side frame. If desired for purposes of ejection of the casting the metallic members 43 may be incorporated in the core members 42. If it be desired to obtain smooth and more accurate inside surfaces of the channel members forming the triangular shaped openings, this may be accomplished by incorporating the metal members 44 in the cores 42 as shown in Figs. 13 and 14.

It is also obvious that other of the core members disclosed herein may be formed, if desired, of metal members with sufficient sand portions intervening to permit the proper shrinking of the casting by crushing the sand cores.

Where it is desired to cast brake-hanger supports integral with the side frame, the necessary mold cavity and core forming parts may be disposed within the auxiliary mold portions 45 through a side aperture which may be closed by the doors 46.

In order to form a smooth and accurate spring seat 11 a metal slab core 47 is provided, there being a suitable sand core 48 extending through the member 47 and into the extensions 41 of the sand cores 38 to provide an aperture 49 through the spring seat 11. The sand core 48 is provided with a head portion 50 which forms a spacer for the cooperating sand members 51 and 52 through which the gate 53 is formed. The members 51 and 52 are properly positioned and locked in place by the use of the L-shaped sand core members 54, which engage the slab core member 47 and engage shouldered recesses in the member 51, as shown in Fig. 1. By this construction the gate is rigidly held in place and a suitable projecting pouring cup 55 may be used if desired.

Underlying the members 51, 52 are sand core members 57, 58 which are provided with extensions 59, which extensions project into recesses in the mold so that the incoming molten metal will flow in streams along the passageway 60 and will not have to flow across the metal of the mold until after its flow has been retarded somewhat. By this means the mold is prevented from being overheated or melted due to the engagement with the more rapidly flowing molten metal.

It will thus be seen that the incoming molten metal will flow over substantially level sand cores and does not come in contact with the metal mold until the stream has been divided and the direction of flow of each branch changed so that any tendency of the hot metal to overheat or wear away the mold is reduced to a minimum.

It will therefore be seen that I have provided a relatively simple, permanent mold structure for molding substantially all of the exterior surfaces of a relatively large, intricate steel casting, and that I have accomplished this with a metal mold which is relatively exceptionally light for metal molds for steel castings.

It will be seen that in the embodiment of my invention herein described the mass of the mold, and hence the chilling capacity thereof, is relatively small. Thus in the present mold the weight thereof is not much greater than the weight of the casting. In previous permanent metal molds for the casting of steel articles the weight of the mold has ordinarily been several times heavier than the article to be cast therein. In the mold herein described, however, the time between pourings is ordinarily sufficient to permit the mold to substantially cool off, and hence I have found the use of a bulky mass of metal mold of large chilling capacity unnecessary.

My mold, therefore, has sufficient chilling capacity for the production of a casting of fine grain, homogeneous, non-porous structure and to prevent deterioration of the mold as by melting due to the high temperature of the casting metal.

It will also be seen that I have provided a relatively simple means for forming the exterior surfaces of the casting and yet have made adequate provision for permitting those parts of the mold which form parts of the exterior surfaces of the casting which face inwardly, that is, toward the center of the casting, also to move inwardly or be moved inwardly sufficiently to permit contraction of the casting toward its center, due to shrinkage and cooling of the molten metal.

Also, I have provided metallic cores for forming portions of the inner surfaces of the casting which face inwardly, such cores being so mounted that they may move or be moved inwardly or in the direction of shrinkage to permit contraction or shrinkage of the metal in the casting upon cooling.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. A separable permanent mold for casting relatively large steel articles of relatively thin section throughout their extent, said mold having metal portions adapted to contact with a relatively large portion of the surface of the article to be cast, said mold having metal portions thereof which form inwardly facing interior and exterior surfaces of the casting withdrawable before the mold is opened to permit shrinkage of the casting upon cooling, and sand and metal cores to form parts of the casting, and means to move the metal cores inwardly of the casting before the mold is opened to permit shrinkage thereof.

2. A permanent mold for casting relatively large steel castings of intricate shape, which comprises, in combination, a separable metal mold relatively light with respect to the casting, said mold being adapted to form substantially all the exterior surfaces of the casting, said cope and drag being provided with portions movable away from the casting at the places where inwardly facing exterior surfaces of the casting occur, so that after the casting has been poured and before the mold is opened these portions may be moved to permit shrinkage of the casting.

3. A permanent mold for casting car truck, steel side frames having columns and top and bottom members forming a central bolster opening, comprising a metal cope and a metal drag forming substantially all the exterior surfaces of the side frame, and metal core members to form portions of the inner faces of said columns and top member and of the side faces of the columns, said core members being movable inwardly before separation of said cope and drag to permit shrinkage of the casting upon cooling.

4. The invention specified in claim 3, in which movable core members are provided to form the spring seat.

5. A permanent mold for casting car truck, steel side frames having columns and top and bottom members forming a central bolster opening, comprising a metal cope and a metal drag forming substantially all the exterior surfaces of the side frame, and metal core members to form portions of the inner faces of said columns and top and bottom member, certain of said core members being movable inwardly simultaneously, before the cope and drag are separated, to permit shrinkage of the casting upon cooling.

6. The invention specified in claim 5, in which the core members are movable inwardly by common operating means.

7. A permanent mold for casting car truck, steel side frames having columns and top and bottom members forming a central bolster opening, comprising a metal cope and a metal drag defining substantially all the exterior surfaces of the side frame and metal core members to form portions of the inner faces of said columns and top, said core member forming a portion of the top member being movable inwardly at a different rate of speed than said side members, said core members being movable inwardly simultaneously by common operating means to permit shrinkage of the casting upon cooling.

8. A permanent mold for casting car truck, steel side frames having integral journal boxes and brake hangers and having a bolster opening and side openings therein, comprising a relatively light, metal cope and drag to form the exterior surfaces of the side frame and journal boxes, metal core members adapted to form portions of the inner surfaces of the sides and top of the bolster opening, means to move inwardly said metal core members forming the upper portion of the bolster opening and to move away from the casting the portions of the cope and drag forming the inwardly facing portions of the exterior faces of the journal boxes, and frangible core members adapted to form the inner surfaces of the side frame and journal boxes and to form the brake hangers.

9. A mold for casting car truck, steel side frames having integral journal boxes, comprising a metal cope and a metal drag to form the exterior surfaces of the side frame and journal boxes, the portions of the cope and drag forming the inwardly facing, exterior faces of the journal boxes being movable away from the casting to permit shrinkage movement of the journal boxes toward the center of the casting, and operating means carried by the cope to move the portions of the cope forming said inwardly facing, exterior faces.

10. A mold for casting car truck, steel side frames having integral journal boxes, comprising a metal cope and a metal drag to form the exterior surfaces of the side frame and journal boxes, the portions of the cope and drag forming the inwardly facing, exterior faces of the journal boxes being movable away from the casting to permit shrinkage movement of the journal boxes toward the center of the casting, and operating means carried by the drag to move the portions of the drag forming said inwardly facing, exterior faces.

11. A mold for casting car truck, steel side frames having a bolster opening, comprising a relatively light metal cope and drag to form the exterior surfaces of the side frame, metal core members adapted to form portions of the inner surfaces of the sides and top of the bolster opening, a shaft journaled in said cope and drag, said core members being operable to be moved inwardly upon rotation of said shaft.

12. A permanent mold for casting car truck, steel side frames having a bolster opening, comprising a relatively light metal cope and drag to form substantially all the exterior surfaces of the side frame, metal core members to form portions of the sides, top and bottom of the side frame, a bolster opening, a shaft mounted for rotatable movement in said cope and drag, said core members being connected to said shaft whereby rotation of said shaft causes said core members to move inwardly to permit shrinkage of the casting upon cooling.

13. A permanent mold for casting a steel article having spaced lateral projections comprising, in combination, metal mold members arranged to cooperate to define substantially all the exterior surfaces of said casting, one of said mold members carrying metal portions arranged to define inwardly facing portions of said lateral projections, said metal portions being movable toward each other directly after the casting metal is poured and before said mold members are separated whereby normal longitudinal shrinkage of said casting may take place readily without disruption thereof.

14. A permanent mold for casting car truck steel side frames having journal boxes integrally formed therewith comprising, in combination, metal mold members arranged to define substantially all the exterior surfaces of said casting, metal mold portions arranged to define the inwardly facing exterior faces of the journal boxes, said metal portions being movable inwardly toward each other to permit shrinkage movement of the journal boxes toward the center of the casting, and operating means carried by mold members to move said movable metal portions.

In testimony whereof I affix my signature.

JOSEPH W. BETTENDORF.